(12) United States Patent
Martin

(10) Patent No.: US 7,703,319 B2
(45) Date of Patent: Apr. 27, 2010

(54) CHARACTERIZATION OF AIRCRAFT WAKE VORTICES

(75) Inventor: Andrew Louis Martin, Ferny Creek (AU)

(73) Assignee: Tele-IP Limited, Victoria (AU)

( * ) Notice: Subject to any disclaimer, the term of this patent is extended or adjusted under 35 U.S.C. 154(b) by 35 days.

(21) Appl. No.: 11/817,302

(22) PCT Filed: Feb. 28, 2006

(86) PCT No.: PCT/AU2006/000245

§ 371 (c)(1),
(2), (4) Date: May 8, 2008

(87) PCT Pub. No.: WO2006/089369

PCT Pub. Date: Aug. 31, 2006

(65) Prior Publication Data

US 2009/0107232 A1    Apr. 30, 2009

(30) Foreign Application Priority Data

Feb. 28, 2005    (AU) .............................. 2005900899

(51) Int. Cl.
*G01F 1/66* (2006.01)

(52) U.S. Cl. ................................ 73/170.13; 73/170.16

(58) Field of Classification Search ........................ None
See application file for complete search history.

(56) References Cited

U.S. PATENT DOCUMENTS

| 2,507,121 | A | 5/1950 | Silvian |
| 3,379,060 | A | 4/1968 | Pear, Jr. |
| 3,671,927 | A | 6/1972 | Proudian et al. |

(Continued)

FOREIGN PATENT DOCUMENTS

DE    198 05 328 A1    8/1999

(Continued)

OTHER PUBLICATIONS

Alekhin, "Use of Radio Electronics for Studying the Atmosphere" Telecommunications and Radio Engineering, vol. 52 No. 7, pp. 51-56, 1998, See p. 53.

(Continued)

*Primary Examiner*—Andre J Allen
(74) *Attorney, Agent, or Firm*—Hovey Williams LLP

(57) ABSTRACT

A bi-static sodar system and method are used to measure and monitor the wake vortices of aircraft in the flight path of an airport runway. A loudspeaker (16) is arranged on one side of the flight path (12) and transmits a series of acoustic pulses to illuminate portion of the flight path. Multiple microphones (18, 20 and 22) are arranged on the opposite side of the flight path (12) so as to receive direct signals from the loudspeaker (16) and forward-scattered echo signals from an echo source (26) within the illuminated portion of the flight path. The microphones (18, 20 and 22) are arranged at different distances from the loudspeaker so that the time intervals between the receipt of the direct and echo signals from each pulse will vary because of the different locations of the microphones. This variation is used to assist in identifying the location and other characteristics of the echo signals and in generating an output indicative of a wake vortex (28).

21 Claims, 6 Drawing Sheets

U.S. PATENT DOCUMENTS

| | | | |
|---|---|---|---|
| 3,675,191 | A | 7/1972 | McAllister |
| 3,889,533 | A | 6/1975 | Balser |
| 3,893,060 | A | 7/1975 | Balser |
| 4,158,401 | A | 6/1979 | Matsumoto et al. |
| 4,558,594 | A | 12/1985 | Balser et al. |
| 4,831,874 | A | 5/1989 | Daubin et al. |
| 5,142,504 | A | 8/1992 | Koster et al. |
| 5,509,304 | A | 4/1996 | Peterman et al. |
| 5,521,883 | A | 5/1996 | Fage et al. |
| 5,544,525 | A | 8/1996 | Peterman et al. |
| 5,615,173 | A | 3/1997 | Brumley et al. |
| 5,661,460 | A | 8/1997 | Sallen et al. |
| 5,808,580 | A | 9/1998 | Andrews, Jr. |
| 5,874,676 | A | 2/1999 | Maki, Jr. |
| 5,979,234 | A | 11/1999 | Karlsen |
| 6,040,898 | A | 3/2000 | Mrosik et al. |
| 6,087,981 | A | 7/2000 | Normant et al. |
| 6,208,285 | B1 | 3/2001 | Burkhardt |
| 6,448,923 | B1 | 9/2002 | Zrnic et al. |
| 6,755,080 | B2 | 6/2004 | Martin |
| 6,987,707 | B2 | 1/2006 | Feintuch et al. |
| 7,106,656 | B2 | 9/2006 | Lerro et al. |
| 7,178,408 | B2 | 2/2007 | Martin |
| 7,284,421 | B2 | 10/2007 | Martin |
| 7,317,659 | B2 | 1/2008 | Martin |
| 2004/0252586 | A1 | 12/2004 | Martin |
| 2008/0285387 | A1 | 11/2008 | Martin |

FOREIGN PATENT DOCUMENTS

| | | |
|---|---|---|
| WO | 94/10583 | 5/1994 |
| WO | WO 01/67132 A1 | 9/2001 |
| WO | WO 03/019230 A1 | 3/2003 |
| WO | WO 2004/077094 A1 | 9/2004 |
| WO | WO 2005/015259 A1 | 2/2005 |
| WO | 2006/089371 A1 | 8/2006 |
| WO | 2006/135955 A1 | 12/2006 |

OTHER PUBLICATIONS

Zak, "Atmospheric Boundary Layer Sensors for Application in a Wake Vortex Advisory System", NASA, Langley Research Center, Apr. 2003.

Pinkel, R. et al. "Repeat-Sequence Coding for Improved Precision of Doppler Sonar and Sodar" Journal of Atmospheric and Oceanic Technology 9(2) pp. 149-163 1992, Whole document, especially section 3 and 5.

Crescenti G.H. "A Look back on Two Decades of Doppler Sodar Comparison Studies" Bulletin of the American Meteorological Society vol. 78, #4 pp. 651-673 1997, Abstract.

Bradley S.G. "Use of Coded Waveforms for SODAR Systems" Meteorology and Atmospheric Physics 71, 15-23 (1999), Whole document.

"Filling Balance FB13 and Balloon Treatment Technical Manual", FB13-US235en-1.2, Aug. 5, 1999, © Vaisala 1999.

Antoniou, I. et al., "On the theory of SODAR measurement techniques" Dated Apr. 2003, Accessed online: Aug. 9, 2006, from <URL: http//www.acoustics.salford.ac.uk/research/von_hunerbein_files/publications/ris-r-1410.pdf> Whole Document.

SCINTEC product information "Acoustic Wind Profilers" document FAS 2004/Jan. 1, 2004. http://www.ctio.noao.edu/sitetests/Manuals/Product_Information_FAS_5.pdf http://web.archive.org/web/20041116184805/ http://www.ctio.noao.edu/sitetests/Manuals/Last modified Apr. 2, 2004, see section 2.5, and p. 2 bottom right, whole document.

UFAM, "3 Acoustic Sounders", Dated Sep. 3, 2004, Accessed online: Aug. 9, 2006 from <URL: http://web.archive.org/web/20040903104918/http://www.env.leeds.ac.uk/ufam/instruments/sodar.php> Whole Document.

CHARACTERIZATION OF AIRCRAFT WAKE VORTICES

This is a national phase application in the United States of International Application PCT/AU2006/000245 filed 28 Feb. 2006, claiming priority from Australian application number 2005900899 filed 28 Feb. 2005, the disclosures of which are incorporated herein by reference.

BACKGROUND OF THE INVENTION

1. Field of the Invention

The present invention relates to sodar apparatus, methods and systems for use in detecting, characterising, recording and/or displaying the wake vortices shed from large aircraft on the approach to or departure flight path of an airport runway. It is more particularly concerned with sodar systems of the bi-static type where the acoustic receiver is down-range of the atmospheric echo source of interest. Thus, the echoes of interest are forward scattered, reflected and/or refracted having regard to the direction of the interrogating acoustic beam. This is to be contrasted with a mono-static system in which the transmitter and receiver tend to be co-located and the echoes of interest are those that are backward scattered, reflected and/or refracted.

2. Description of Related Art

Bi-static sodar systems have long been proposed and used for the sounding of the lower atmosphere where atmospheric discontinuities tend to be horizontal, slow moving and wide spread, except in storm conditions. This allows the use of a single transmitter and a single receiver located down-range from the transmitter by a known distance and the use of simple triangulation to determine the height of a source of 'echoes' from forward scattered, refracted and/or reflected transmitted signals. It is well known in such systems to track atmospheric anomalies over long periods of time by using a pulse transmitter and listening for echoes between pulses. Sufficiently strong echo signals allow Doppler components to be extracted that provide an indication of the velocity of movement of echo sources either vertically or down-range.

However, conventional bi-static sodar systems of the type indicated are unsuited to the characterization of wake vortices which are typically close to the ground and capable of rapid movement in three dimensions over their relatively short durations. The simple triangulation techniques of bi-static sodar are inadequate for such an application.

A serious and more general problem with the use of sodar techniques for atmospheric sounding arises from their inherently poor signal-to-noise ratio [s/n] due to (i) the limited power of acoustic transmitters (ii) the strong attenuation of acoustic waves in the atmosphere and (iii) the prevalence of acoustic noise. The latter problem is of particular importance in a noisy airport environment, especially when attempting to detect wake vortices of aircraft as they pass down (or up) the flight path.

The above problems have been addressed in our prior international applications PCT/AU01/00247, PCT/AU02/01129, PCT/AU04/00242 that disclosed sodar systems with exceptionally high s/n ratios. Our prior systems have variously employed long duration transmitted pulses encoded in a 'pulse compression' manner, over-sampling of received echoes for good resolution and processing gain, and the use of matched filter tailored to the pulse-compression code to provide low-power, long range sodars capable of extracting excellent Doppler signals from the received echoes. The pulses—generically called 'chirps'—employed in our prior inventions preferably had durations in the order of tens of seconds. The pulse-compression technique employed was preferably a linear increase or decrease in phase (tone) over the duration of the pulse; for example, a steady increase in tone from 500 to 1500 Hz, or a steady decrease in tone from 1500 to 500 Hz. The methods disclosed involved 'listening while sending'; that is, echoes are received and processed while transmission of the chirp is still under way. This technique not only allows very high system and processing gains that result in exceptionally good s/n (signal to noise ratio), but it also enables atmospheric discontinuities that occur close to the ground to be detected.

The present specification should also be read in conjunction with our international patent application PCT/AU2004/001075 entitled "Detection of Wake Vortices and the Like in the Lower Atmosphere" which taught the technique of sounding the atmosphere near an airport runway when a wake vortex is not present to generate a reference dataset, then sounding the atmosphere when it is suspected that an wake vortex might be present to generate an active dataset and differencing the two datasets to highlight a vortex, if present. Finally, this specification should be read in conjunction with our co-pending Australian patent application entitled "Staged Sodar Sounding" (to be published), which teaches sodar techniques wherein a set of long chirps is employed in a 'send-then-listen' mode in which the echoes generated by the pulses are extracted using matched filter methods. While the sodar systems disclosed in our prior applications were capable of detecting wake vortices and of monitoring wind conditions in the vicinity of airports with much greater sensitivity and precision than was previously possible, they still left something to be desired in tracking an intense wake vortex as it moves in three dimensions.

For brevity, the disclosures in our published applications are regarded as being incorporated herein, including the extensive discussion of the prior art contained in the specifications of those applications. In addition, some of the terminology that is used herein is explained or defined in those specifications.

In the following, the term 'flight path' will be used to designate the volume of the lower atmosphere near either end of an airstrip or runway through which aircraft pass on approach to or take-off from an airport. It is here where persisting wake vortices are caused by large aircraft and can be dangerous for other smaller aircraft using the flight path even minutes later.

BRIEF SUMMARY OF THE INVENTION

From one aspect, the present invention comprises a bi-static sodar system for measuring and monitoring the wake vortices of aircraft in the flight path of an airport runway. The system includes sodar transmitter means arranged on one side of the flight path and adapted to transmit a series of acoustic pulses to illuminate portion of the flight path. The system also includes sodar receiver means arranged opposite the transmitter means on the other side of the flight path for receiving echoes of transmitted sodar signals from atmospheric disturbances within the illuminated portion of the flight path. The receiver means includes acoustic sensors or microphones located at different locations which are at different distances from the transmitter and the receiver means is adapted to determine the time interval between a direct signal received from the transmitter means at each location and subsequent echo signals received at each location. The receiver means includes processor means adapted to correlate the time intervals determined at each location and to compute the position within the wake vortex from which the respective echo signals are generated.

The transmitter means may comprise a linear array of multiple loudspeakers aligned with the flight path and the receiver means may comprise multiple parallel linear arrays of microphones also aligned with the flight path, each microphone array being located at a different distance from the loudspeaker array. The transmitter means is preferably adapted to transmit a series of acoustic pulses in a pulse-compression format and the receiver means preferably includes matched-filter detectors for processing the received signals and extracting the echoes therefrom. A loudspeaker driver means is preferably employed to drive the loudspeakers in parallel so that each loudspeaker generates the same acoustic pulse at the same time and in the same phase as each other speaker. Preferably, the loudspeakers are baffled and configured so as to facilitate or enhance such 'iso-phase' operation.

We have found that three arrays of microphones are generally adequate for effective echo detection, discrimination and location, but we have also found that the performance of the system can be significantly improved if each microphone array is mounted at a different height to the others—and most preferably so that the height of the arrays increase with distance from the loudspeaker array.

From another aspect, the invention comprises a method of monitoring and measuring aircraft wake vortices in the flight path of an airport by illuminating portion of the flight path with acoustic pulses from transmitter means located one side of the flight path and using receiver means on the other side of the flight path opposite the transmitter means to (i) detect both direct and echo signals from each transmitted pulse at each one of a plurality of locations that are spaced at different distances from the flight path (ii) determine the time interval between receipt of the direct and echo signals at each location and (iii) employ the determined time intervals to compute parameters or characteristics of the detected echoes such as location within the flight path of the source of the echoes and phase, frequency [Doppler] and amplitude components. The receiver means will therefore also preferably be used to analyze the echo signals and to generate outputs indicative of the amplitude and Doppler or phase components in the detected echo signals using techniques known in the art and, in particular, as taught by our prior patent applications.

It will be appreciated that there will normally be multiple anomalies (ie, echo sources) associated with the aircraft wake vortices that will result in multiple overlapping echoes being detected by the receiver. These echoes need to be identified, extracted and analyzed. It is therefore desirable to apply the chirped transmit signals and matched filter processing of received signals that have been disclosed in our associated published patent applications, whether 'listen-while-sending', 'send-then-listen', 'narrow chirp' or 'time domain' methods are employed. The matched filtering may be performed in the frequency domain or in the time domain, with the former being preferred because of cost and efficiency. Again, the reader is referred to our associated patent applications for a detailed description of such techniques.

However, we have found that, in the present application, linear (pulse-compression) chirps in the frequency range of 1.5 kHz to 3.5 kHz are suitable with the range of 2 kHz to 3 kHz being preferred. We have also found that, for the present application, transmit pulse lengths of between 0.2 s and 0.6 s and pulse intervals of between 0.75 s and 2 s are suitable for send-then-listen systems of the type indicated herein, with pulse lengths of 0.25 s to 0.35 s being optimum for normal size runways at international airports. On the other hand, we have found that transmit pulse lengths of between 0.5 s and 2.5 s and listening times of between 1 s and 3 s are suitable for send-while-listening systems, with pulse lengths of 0.75 s to 2.25 s being optimal for normal size runways at international airports.

In operation, the array of loudspeakers will illuminate a volume of air along and across the aircraft flight path with acoustic signals and the microphones of each array will detect both the direct signals from the array of loudspeakers and the resultant forward-scattered echoes.

Having portrayed the nature of the present invention, particular examples will now be described with reference to the accompanying drawings. However, those skilled in the art will appreciate that many variations and modifications can be made to the chosen example while conforming to the scope of the invention as outlined above and as defined in the following claims.

DETAILED DESCRIPTION OF THE INVENTION

Figure 1:
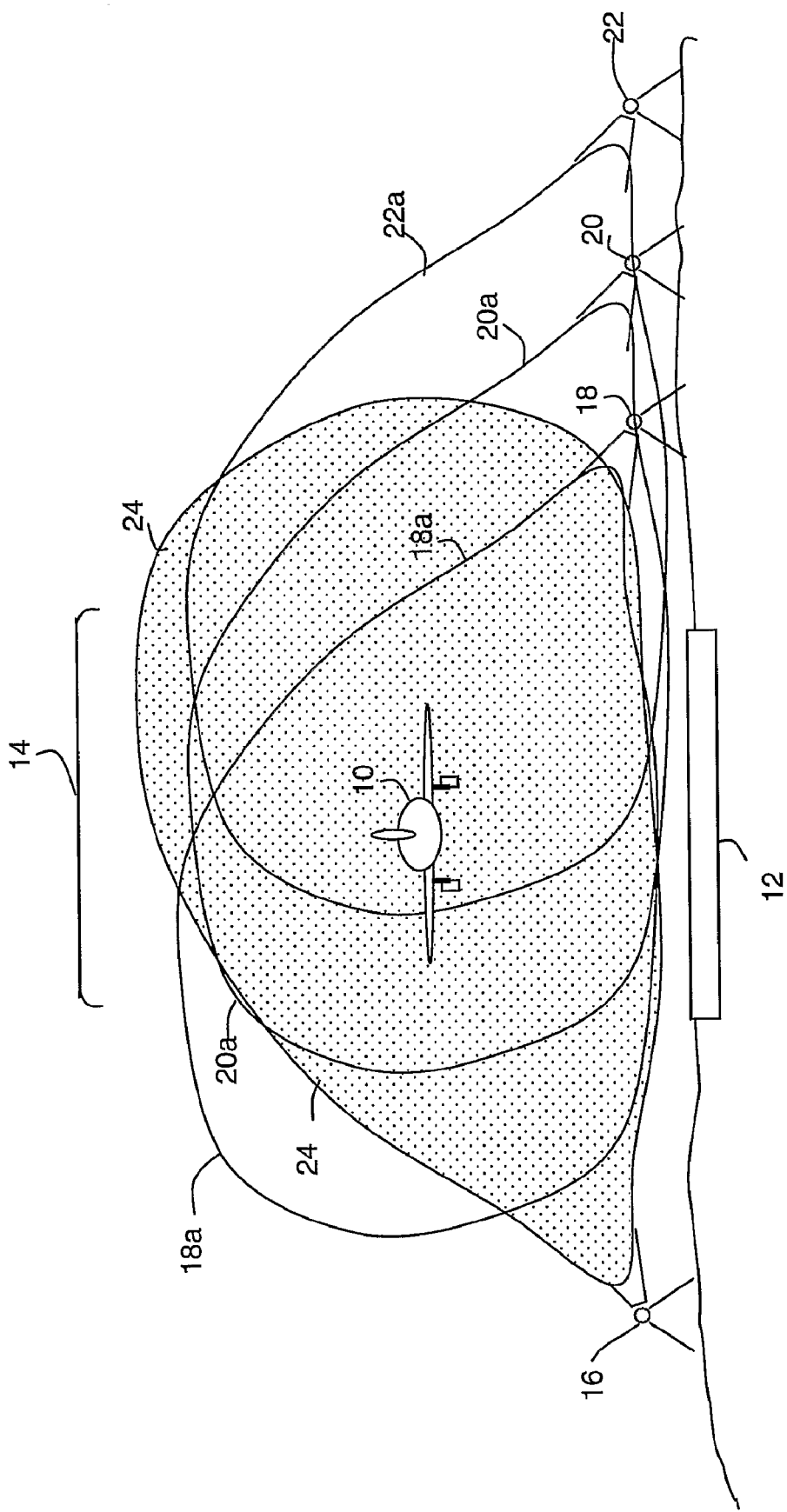
FIG. 1 is a diagrammatic end elevation of an airport runway showing a landing aircraft within the portion of the flight path that is illuminated by an array of transmitters and interrogated by three arrays of receivers.
Figure 2:
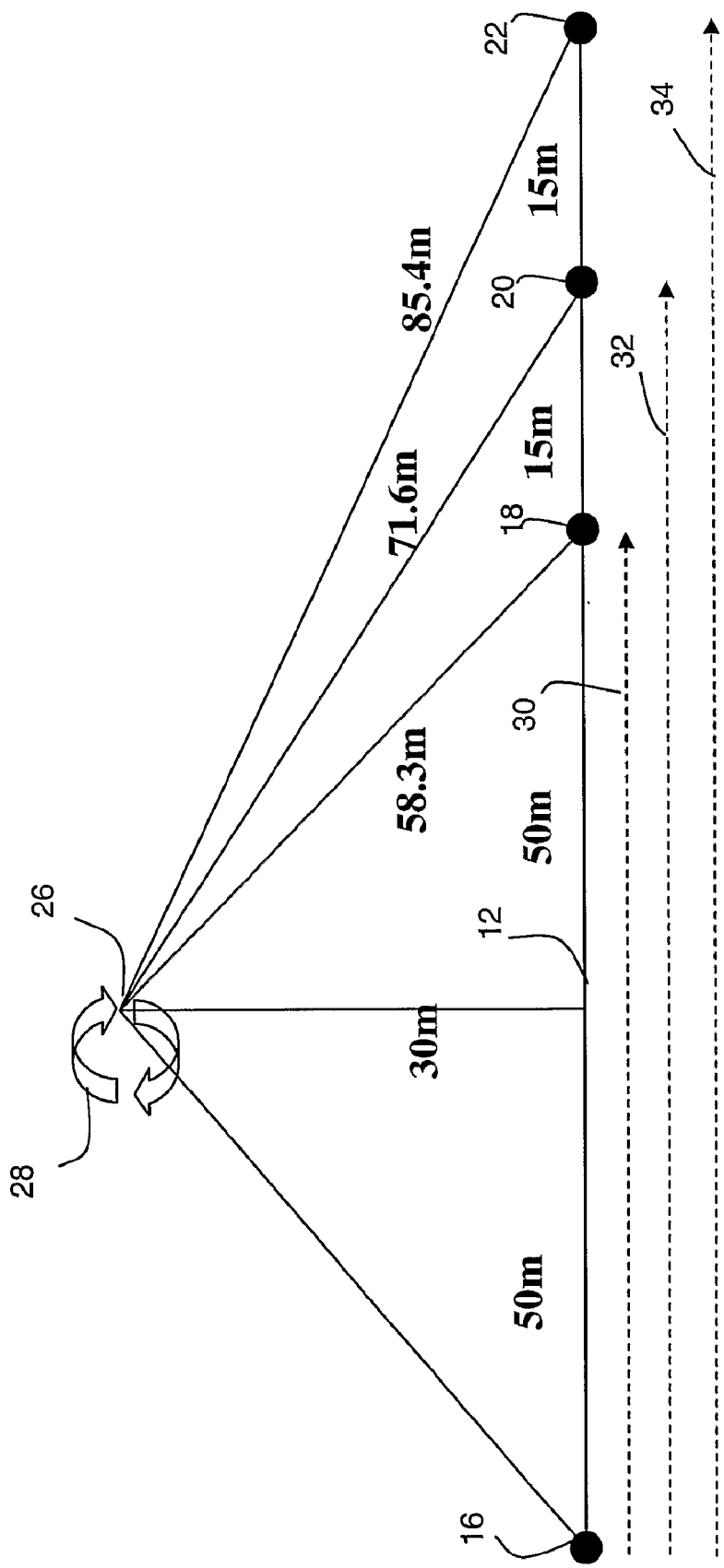
FIG. 2 is a simplified version of FIG. 1 in which illustrative dimensions are shown.
Figure 3:
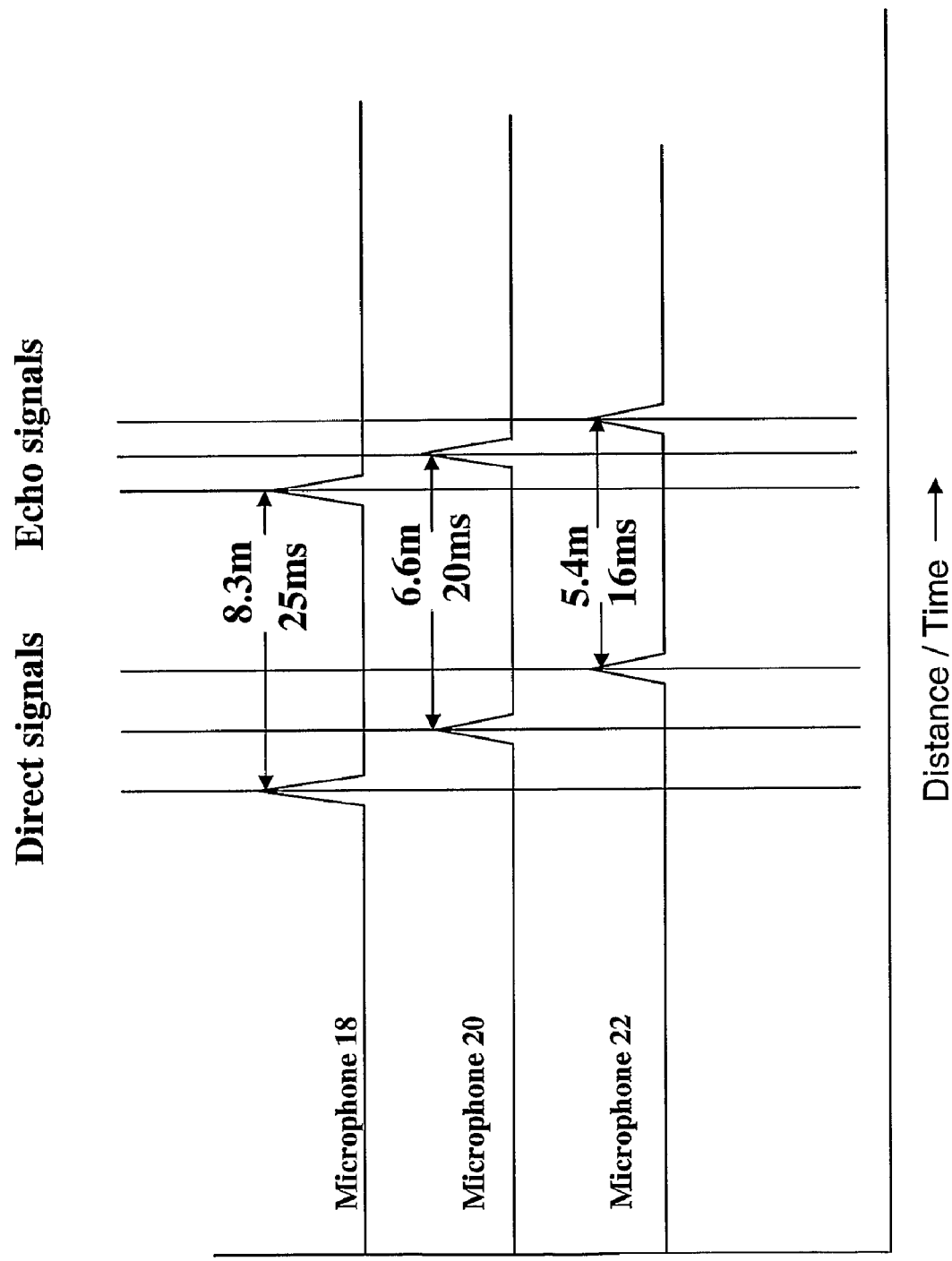
FIG. 3 is a set of graphs indicating the delay between receipt of the direct and echo signals at each microphone of FIGS. 1 and 2.

FIGS. 1, 2 and 3 are intended to illustrate the general principles of the invention. In FIG. 1, an aircraft 10 is shown approaching an airport runway 12 and located within an approach flight path indicated at 14. Aircraft 10 is assumed to have just passed between a loudspeaker 16 (constituting the acoustic transmitter means) located on the left side of runway 12 and an array of three microphones 18, 20 and 22 (that constitutes the acoustic receiver means) located on the other side of runway 12 opposite loudspeaker 16. Microphones 18, 20 and 22 are located at successive greater distances from loudspeaker 16. The portion of flight path 14 that is effectively illuminated by loudspeaker 16 is shown in section and shaded at 24. The sections of flight path 14 interrogated by microphones 18, 20 and 22 are indicated by shapes 18a, 20a and 22a. That is, these are the areas in which echo sources can be detected by the respective microphones.

FIG. 2 depicts an illustrative simple two-dimensional geometry applicable to FIG. 1 in order to illustrate the different path lengths that the direct signals from loudspeaker 16 must travel to microphones 18, 20 and 22 and the different path lengths that echo signals from an echo source 26 in a vortex 28 must travel to each microphone 18, 20 and 22. It is assumed that echo source 26, loudspeaker 14 and microphones 18, 20 and 22 are all in the same vertical plane, that echo source 26 is at an elevation of 30 m centrally above runway 14, that loudspeaker 16 is located 50 m on the left of the center of runway 14, microphones 18, 20 and 22 are located opposite at distances of 50 m, 65 m and 80 m respectively from center of runway 14.

It can be easily calculated that the distances which echo signals must travel from echo source 26 to microphones 18, 20 and 22 are respectively 58.3 m, 71.6 m and 85.4 m. In other words, the echo signals from echo source 26 in vortex 28 have to travel 8.3 m, 6.6 m and 5.4 m to microphones 18, 20 and 22 respectively more than the corresponding direct signals indicated by broken-line arrows 30, 32 and 34. These differences in path lengths for direct and echo signals are diagrammatically illustrated in FIG. 3 and directly translate (by using the known velocity of sound in air) into respective time intervals between receipt of direct and echo signals at each microphone in the array.

While the simple triangulation method of conventional bi-static sodar using a loudspeaker 16 and any one of microphones 18, 20 an 22 would allow variations in the height of echo source 26 to be tracked effectively so long is it remained substantially in the same vertical plane as the speaker and microphone, this is of little value for tracking vortex anomalies that move in three dimensions because many echo sources that do not lie in the vertical plane passing through transmitter and receiver would yield the same time interval between direct signal and echo signal reception. We have found that, by combining the time intervals measured at multiple locations that vary in distance from the transmitter, it is possible to accurately determine the location of the echo source in three dimensions and in time. Furthermore, we have found that the accuracy of echo location is significantly enhanced if the multiple microphones are located at different heights and, preferably, if the height increases with distance from the runway or transmitter. These experimental findings have now been mathematically confirmed and publication in the scientific literature is planned.

Figure 4:
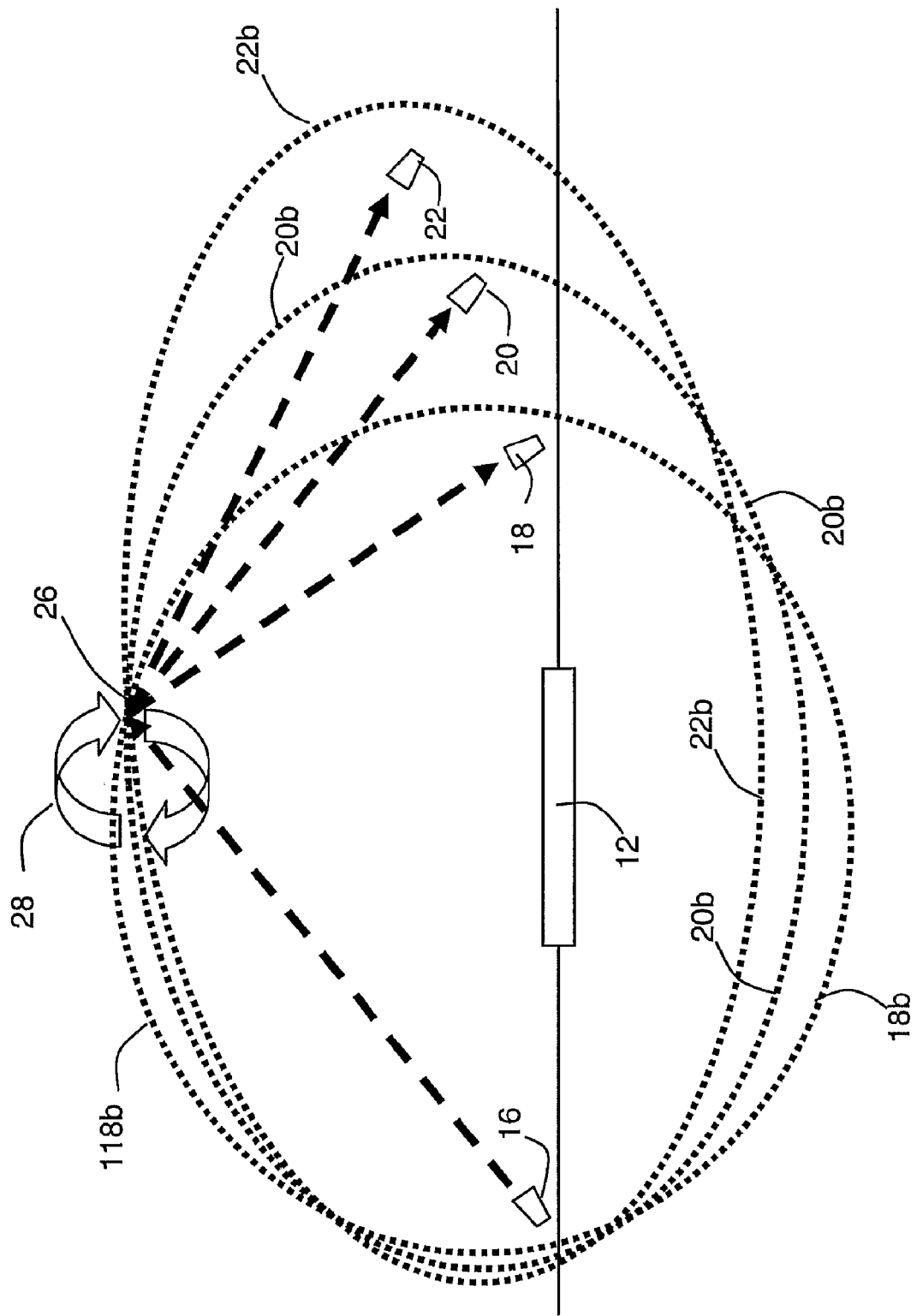
FIG. 4 is a similar view to those of FIGS. 1 and 2 intended to illustrate the benefit of using three microphones.

Though it is difficult to depict in a two dimensional diagram, the manner in which the time intervals between reception of a direct signal and an echo signal by each microphone can be used to locate the echo source in three dimensions is indicated schematically in FIG. 4. Here, microphones 18, 20 and 22 are mounted at successively increasing heights. The broken-line ellipses 18b, 20b and 22b respectively indicate (necessarily in two dimensions) the three dimensional contour of positions where echo source 26 will result in the same time intervals between direct and echo signals at microphones 18, 20 and 22 respectively. This would lead to serious ambiguity in echo location if any one of the microphones was use alone. However, for any particular location of echo source 26 (in range) there will be a unique pattern of time intervals from the three microphones that will uniquely signify that location. This is diagrammatically indicated by the intersection of the ellipses 18b, 20b and 22b at echo source 26 (and approximately at loudspeaker 16).

Figure 5:
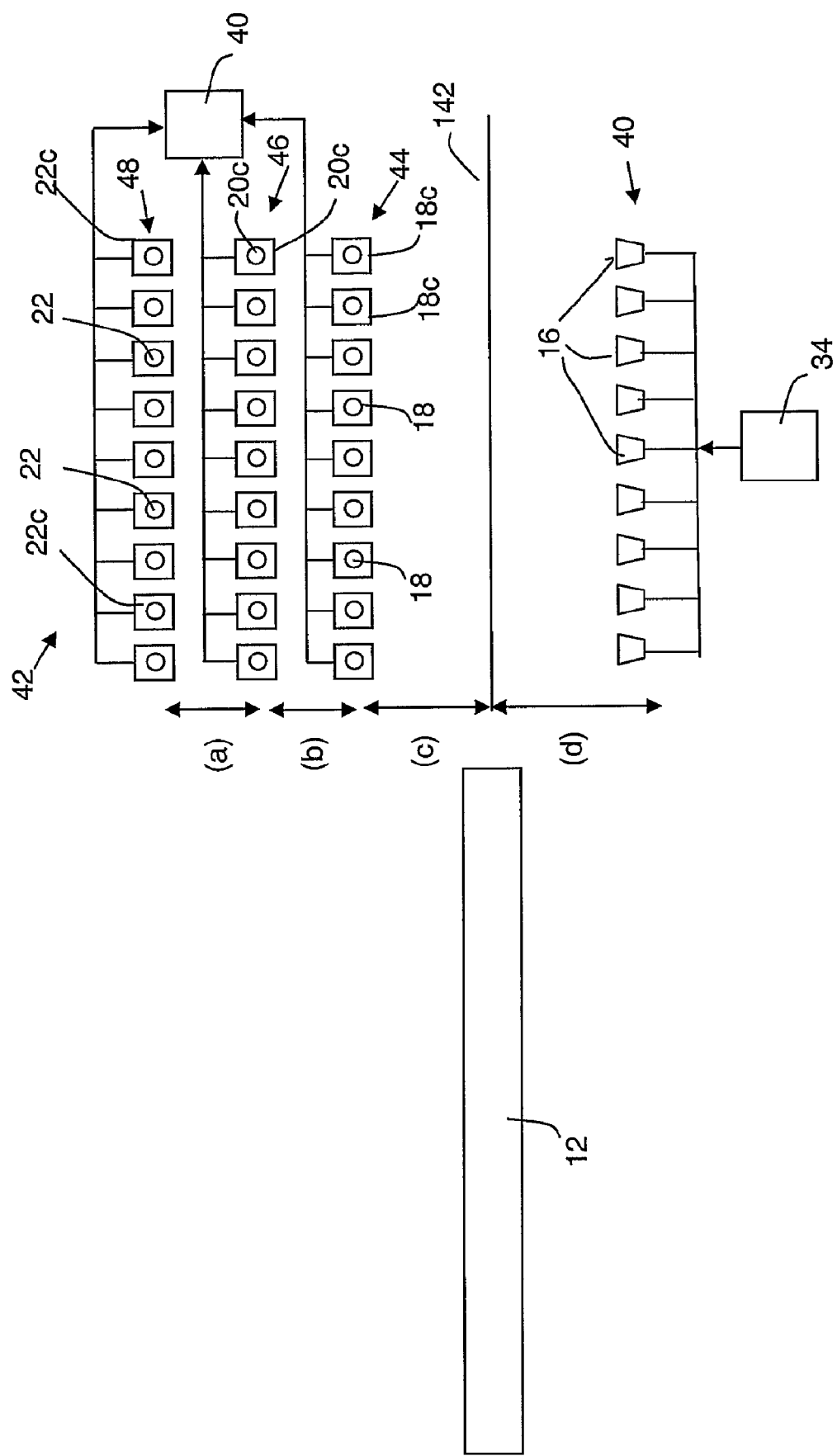
FIG. 5 is a plan view of a modified system of the type shown in FIG. 1.

Since the position along a flight path at which a wake vortex might occur cannot be determined with any certainly, it is preferable to arrange multiple loudspeakers and microphones in elongate parallel arrays on their respective sides of the flight path. This is illustrated in FIG. 5 in plan view where a transmitter array 40 of nine loudspeakers 16 is arranged parallel with flight path 14 on the approach end of runway 12 and is opposed by a receiver array 42 comprising three rows 44, 46 and 48 of nine microphones 18, 20 and 22 (respectively) in each row. In practice there are likely to be at least thirty loudspeakers in the transmitter array and 3×30 microphones in the microphone array. The spacing of transmitter array 40 and each row of microphones can be assumed to be as in FIG. 2; that is, the distances indicated by arrows (a), (b), (c) and (d) are respectively 15 m, 15 m, 50 m and 50 m. The loudspeakers 16 in array 40 are preferably all mounted at the same height, and the microphones 18 in row 44 are also preferably mounted at the same height, the microphones 20 in row 46 are also preferably mounted at the same height, and the microphones 22 in row 48 are also preferably mounted at the same height (though, as already noted, the microphones of different rows will be at different heights).

In this example, loudspeakers 16 are connected and driven in parallel by a common driver circuit 34 that delivers a common chirp signal simultaneously to each. We have found that, with the short ranges indicated in FIGS. 2 and 3, it is preferable to use the send-then-listen technique using chirped transmit pulses that increase in frequency from about 2.2 kHz to about 2.8 KHz in a strictly linear fashion over a period of about 0.3 s (pulse length) and to allow a time interval (listening time) of about 1.2 s between pulses. This gives a repetition (update) rate of about 1.5 s. Longer ranges suggest the use of send-while-listening techniques but satisfactory results can be obtained in the system of the example using transmit pulses of about 1 s in duration and (overlapping) listening times of about 1.9 s so that the repetition rate can be about 2 s. In either case, however, it is preferred to use the frequency [Fourier] disclosed in our prior patent applications to ensure adequate s/n despite the noisy airport environment.

Also, care needs to be taken in the design or choice of loudspeaker horns to ensure that the chirps emerging from all loudspeaker units will be in-phase. It is convenient to select loudspeaker horn assemblies that will serve as both transmitters and microphones. Suitable horns are model SC-630 of the TOA brand manufactured in the USA, which are capable of delivering a three Watt 2 kHz-2 Khz chirp without distortion. Having folded horns, these transducers are well suited for mounting facing upwards as would be required for service as microphones. However, when each microphone horn needs to be separately and thoroughly baffled at all points except the open top. It is also advantageous to baffle each transmitter horn in the same manner to minimize resonance caused by adjacent speakers.

In this example, and as shown in FIG. 5, each microphone 18, 20 and 22 is shown as a circle in a box to indicate that the microphone is built into an associated receiver indicated at 18c, 20c and 22c respectively. Each receiver includes at least a filter and pre-amplifier but, preferably, also includes a PC-based matched filter system of the type disclosed in one or more of our prior patent applications that is adapted to output amplitude and Doppler signals derived from the echoes received. The output of each receiver is independently connected for storage, consolidation, analysis and display in receiver processor 36 in the manner disclosed in one or more of our prior patent applications. The manner in which receiver outputs are combined depends on the linear spacing of the receivers in their arrays or rows. If compact, outputs can be combined; if spread out over a considerable distance (eg, of the order of 1 km), the outputs will best be treated separately to allow echo sources to be tracked along a flight path.

As already indicated, a variety of signal formats and signal processing methods can be used. A send-then-listen system can be used that takes into account the spacing of the receivers from the transmitter. This would give a maximum pulse length of 0.3 s and a minimum listen time (ie, interval between pulses) of about 1.2 seconds for an echo path length of up to about 300 m. Alternatively, if a listen-while-sending system was adopted, transmit pulses of about 1 s could be used with listening times of about 1.9 s for a 300 m echo path length. Details of both such systems have been provided in our above-referenced prior patent applications.

Figure 6:
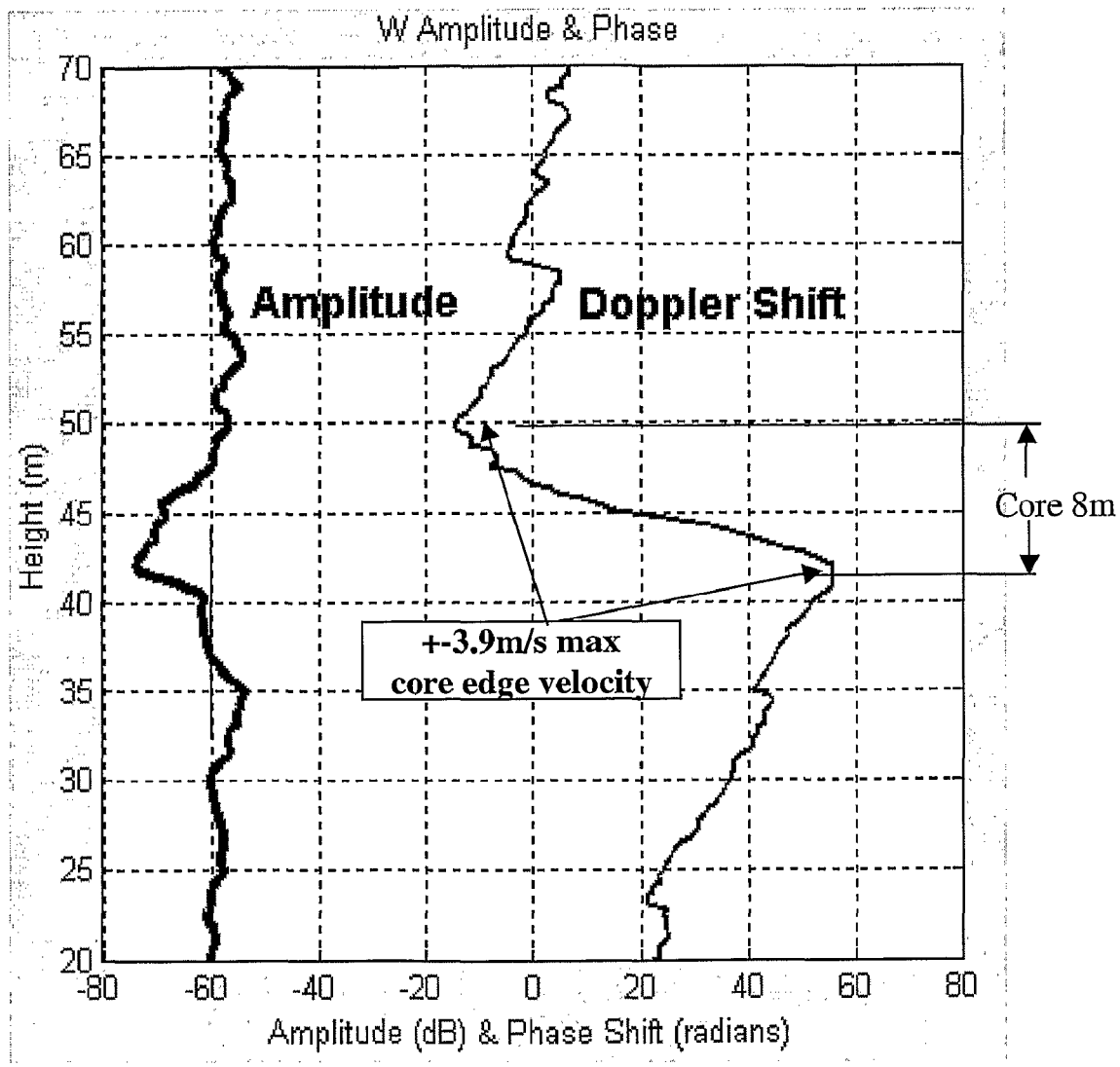
FIG. 6 is a chart of the results of a practical test using the system of FIG. 1 and with one transmitter and three microphones.

Finally, the graph shown FIG. 6 has been included to indicate the type of results that can be obtained in the field using the system disclosed herein where only one loudspeaker and three opposing microphones are employed. This graph shows data relating to a wake vortex shed by a Boeing 737 during an approach to the main runway at Melbourne airport using a send-while-listening system. The phase response shows a spacing of 8 m between peaks of the Doppler signal, the peaks being indicative of the maximum core edge velocities (as noted in the graph). Assuming that the circulation strength of the wake vortex of a Boeing 737 was 70 m/s$^2$ (in line with published data) at the time as the sodar measurements were taken and that the relationship between circulation strength and averaged sodar-measured maximum core edge velocity is linear, then the constant of proportionality can be calculated to be 16.6, giving:

Circulation strength=16.6 Measured Peak Velocity

This simple relationship needs to be calibrated for each sodar setting. Calibration can be achieved by first using the theory below to estimate the scaling factor and then calibrating the scaling constant against other know measurement techniques.

The theory for spatial averaging for short pulse sodars is given in http://wwwe.onecert.fr/projets/WakeNet2-Europe/fichiers/publications/publi2005/Bradley%20et%20al%20SODAR.pdf, 22 Oct. 2005. This theory of spatial averaging indicates that the relationship between the velocity measured by a sodar and the circulation strength is probably linear.

While an example of the implementation of aspects of the present invention has been described, it will be appreciated by those skilled in the art that many variations and of the described example are possible and that many other examples can be devised or postulated without departing from the scope of the invention as set out in the following claims. For example, because of the proximity of the receiver to the transmitter, the direct transmitter signal may be formed by an electronic wire or wireless signal to provide a reference for the time delays associated with echo reception at the respective microphone arrays. However, there is little advantage in this as the direct acoustic signal will be received at each microphone whether or not an electronic direct signal reference is employed.

The invention claimed is:

1. Bi-static sodar apparatus adapted to detect and monitor aircraft wake vortices within an aircraft flight path, the apparatus including:
   acoustic transmitter means adapted for location on one side of the flight path and operable to acoustically illuminate a portion of the flight path with acoustic pulses, when so located,
   acoustic receiver means adapted to receive and detect said acoustic pulses together with acoustic echoes generated thereby within said portion of the flight path,
   a plurality of acoustic sensors within said acoustic receiver means, wherein each of said acoustic sensors is adapted to be arranged at a different physical location within the receiver means so that, upon installation of the receiver means opposite the transmitter means and on an other side of said portion of the flight path, said acoustic sensors will be at respectively different distances from said transmitter means, and
   processor means adapted for connection to the receiver means for receiving and processing output signals generated by said acoustic sensors to enable the detection and monitoring of aircraft wake vortices in said portion of the flight path.

2. Apparatus according to claim 1, wherein:
   said processor means is adapted to determine, for each of said plurality of sensors, the time intervals between the reception of a direct transmitted pulse from the transmitter and a corresponding echo generated thereby in order to determine the location of the source of said corresponding echo.

3. Apparatus according to claim 1, wherein:
   said transmitter means comprises a linear array of multiple loudspeakers adapted for mounting along the flight path and adapted to acoustically illuminate an elongate volume of air within the flight path with said acoustic pulses,
   said receiver means comprises an array of multiple linear rows of microphones, each row of microphones being adapted for mounting at a different location within the receiver means.

4. Apparatus according to claim 3, wherein:
   the microphones of each of said rows of microphones are adapted for mounting at substantially the same height within their respective row, and
   each row of microphones is adapted for mounting at a different height with respect to other of said rows of microphones.

5. Apparatus according to claim 2, wherein:
   said transmitter means includes loudspeaker driver means connected to each loudspeaker in said loudspeaker array so that, in operation, each loudspeaker of the array transmits the same said acoustic pulse at the same time and substantially in-phase.

6. Apparatus according to claim 5 wherein,
   said loudspeaker driver means is adapted to generate an acoustic pulse for driving said loudspeaker array that has a pulse-compression waveform, and said processor means includes matched-filter means adapted to use said pulse-compression waveform to process said output signals and extract wake vortex data therefrom.

7. A bi-static sodar system for detecting and monitoring aircraft wake vortices within an aircraft flight path, wherein:
   acoustic transmitter means is located on one side of the flight path and operable to acoustically illuminate a portion of the flight path with a series of acoustic pulses,
   acoustic receiver means is arranged on an other side of the flight path opposite said transmitter means,
   said receiver means is adapted to receive and detect said acoustic pulses direct from the transmitter means together with acoustic echoes of said pulses emanating from within said portion of the flight path,
   said receiver means includes a plurality of acoustic sensors that are arranged at different physical locations within the receiver means so as to be at respectively different distances from said transmitter means across the flight path, and
   said receiver means includes processor means connected to receive and process output signals generated by said acoustic sensors from direct signals received direct from said transmitter means and from said echoes, whereby said processor is enabled to generate an output indicative of the location of the sources of said echoes.

8. A system according to claim 7 wherein:
   said acoustic sensors at each location are arranged at different heights with respect to acoustic sensors at others of said locations.

9. A system according to claim 7, wherein:
said processor means is adapted to determine the time interval between said output signals generated by said acoustic sensors from direct signals and said echoes at each of said locations.

10. A system according to claim 7, wherein:
said transmitter means comprises a linear array of multiple loudspeakers mounted along said one side of the flight path so as to thereby be adapted to acoustically illuminate an elongate volume portion of the flight path with said acoustic pulses,
said acoustic sensors comprise microphones,
said microphones are arranged in a linear array comprising multiple linear rows of microphones mounted along said other side of the flight path so as to be substantially parallel with said array of loudspeakers,
each of said rows of microphones is located at a different distance from the array of loudspeakers with respect to the microphones of each other row.

11. A system according to claim 10, wherein:
each of said rows of microphones is mounted at a different height with respect to each other of said rows.

12. A system according to claim 10 wherein:
the height of each row of microphones increases with distance from the array of loudspeakers.

13. A system according to claim 10, wherein:
said transmitter means includes loudspeaker driver means connected to each loudspeaker in said array so that, in operation, each loudspeaker of the array transmits the same acoustic pulse at the same time and with substantially the same phase as every other loudspeaker.

14. A system according to claim 13 wherein,
said loudspeaker driver means is adapted to generate an acoustic pulse for driving said loudspeaker array that has a pulse-compression waveform, and said processor means includes matched-filter means adapted to use said pulse-compression waveform to process said output signals and extract wake vortex data therefrom.

15. A system according to claim 14 wherein:
said pulse compression waveform is a linear chirp that has frequencies in the 2 kHz to 3 kHz range and a duration of between 0.2 and 2.5 s,
said processor means includes matched filter means adapted to the pulse compression waveform of said linear chirp so as to thereby facilitate identification and monitoring of echo signal components indicative of wake vortices.

16. A bi-static sodar method of detecting and monitoring and measuring aircraft wake vortices in a flight path of an airport runway, said method including the steps of:
generating a series of acoustic pulses by transmitter means located on one side of the flight path to illuminate a portion of the flight path,
employing receiver means to detect both direct and echo signals from each transmitted pulse at each one of a plurality of locations on an other side of the flight path from the transmitter, said locations being spaced at different distances from the transmitter means,
determining the time interval between receipt of the direct and echo signals at each location, and
employing the determined time intervals to compute attributes of the detected echoes to thereby enable detection and monitoring of wake vortices in said portion of the flight path.

17. A method according to claim 16, including the steps of:
generating said acoustic pulses with a common pulse-compression waveform, and
detecting said direct and echo signals by matched filter techniques adapted to said pulse-compression waveform.

18. A method according to claim 17, including the steps of:
generating said acoustic pulses with said pulse-compression waveform so each pulse is a linear frequency modulated chirp having frequencies within the range 2 kHz to 3 kHz, a duration of between 0.25 s and 0.35 s and pulse intervals of between 0.75 s and 2 s, and
detecting said direct and echo signals by said matched filter techniques during the intervals between pulses.

19. A method according to claim 17, including the steps of:
generating said acoustic pulses with said pulse-compression waveform so each pulse is a linear frequency modulated chirp having frequencies within the range 2 kHz to 3 kHz, a duration of between 0.75 s and 2.25 s and,
detecting said direct and echo signals from each transmitted pulse during a detection period of between 1 s and 3 s including the time during which each pulse is being transmitted.

20. A method according to claim 16, wherein:
said receiver means includes acoustic sensors positioned at each of said locations and adapted to detect said direct and echo signals at each location,
the acoustic sensors at one location are at a different height to the acoustic sensors at each other location,
the method includes the step of separately determining the time interval between receipt of the direct and echo signals by the respective acoustic sensor means at each location.

21. A bi-static sodar method of detecting and monitoring and measuring aircraft wake vortices in a flight path of an airport runway, said method including the steps of:
generating a series of acoustic pulses in unison from a linear array of multiple loudspeakers located along one side of a portion of the flight path to illuminate said portion of the flight path,
employing an acoustic receiver array located on an other side of the flight path, said acoustic receiver array comprising multiple rows of microphones to detect both direct and echo signals from each transmitted pulse at each one of said rows of microphones, each of said rows of microphones being located substantially parallel with said array of loudspeakers but at a different distance from said array than each other of said rows,
determining the time interval between receipt of the direct and echo signals for each row of microphones, and
employing the determined time intervals to compute attributes of the detected echoes to thereby enable detection and monitoring of wake vortices in said portion of the flight path.

* * * * *